United States Patent
Hundley et al.

(10) Patent No.: US 9,533,642 B2
(45) Date of Patent: Jan. 3, 2017

(54) HIERARCHICAL SANDWICH STRUCTURES

(71) Applicant: GM GLOBAL TECHNOLOGY OPERATIONS LLC, Detroit, MI (US)

(72) Inventors: Jacob M. Hundley, Los Angeles, CA (US); Alan J. Jacobsen, Woodland Hills, CA (US); Sophia Yang, Arcadia, CA (US); Eric C. Clough, Santa Monica, CA (US); Jay C. Kussmaul, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 40 days.

(21) Appl. No.: 14/497,036

(22) Filed: Sep. 25, 2014

(65) Prior Publication Data

US 2016/0090056 A1    Mar. 31, 2016

(51) Int. Cl.
*B60R 19/00* (2006.01)
*B60R 19/18* (2006.01)

(52) U.S. Cl.
CPC ........ *B60R 19/18* (2013.01); *B60R 2019/1866* (2013.01)

(58) Field of Classification Search
CPC ................ B60R 19/18; B60R 2019/1866

USPC ........................ 296/187.02, 187.09, 187.11, 187.12,296/187.03; 293/120, 102
See application file for complete search history.

(56) References Cited

U.S. PATENT DOCUMENTS

| 7,382,959 | B1 | 6/2008 | Jacobsen | |
| 7,653,279 | B1 | 1/2010 | Jacobsen | |
| 2008/0012364 | A1* | 1/2008 | Boggess | ................. B60R 19/18 293/120 |
| 2014/0141192 | A1* | 5/2014 | Fernando | .............. E06B 3/6775 428/76 |

* cited by examiner

*Primary Examiner* — Joseph D Pape
(74) *Attorney, Agent, or Firm* — John A. Miller; Miller IP Group, PLC

(57) ABSTRACT

A hierarchical sandwich box impact beam for a vehicle that includes spaced apart micro-truss sandwich structures defining an open area therebetween. The impact beam includes an outer facing sandwich structure including an outer facesheet, an inner facesheet and a micro-truss core formed therebetween, and an inner facing sandwich structure including an outer facesheet, an inner facesheet and a micro-truss core formed therebetween. One or more structural connecting sections are coupled to the inner and outer facing sandwich structures so as to define the open area between the structures.

38 Claims, 7 Drawing Sheets

HIERARCHICAL SANDWICH STRUCTURES

BACKGROUND OF THE INVENTION

Field of the Invention

This invention relates generally to a hierarchical sandwich or box structure and, more particularly, to a sandwich box impact beam for a vehicle that includes spaced apart micro-truss sandwich structures defining an open area therebetween.

Discussion of the Related Art

Modern vehicles are equipped with a number of impact beams providing structural integrity against collisions and impacts with other objects, such as other vehicles. More particularly, impact beams are traditionally used in vehicle designs to protect occupants from front, side and/or rear impacts by absorbing energy through deformation in the event of a vehicle crash and distributing the applied dynamic loads to other energy absorbing sub-systems on the vehicle. For example, it is known to provide impact beams in a front energy management or bumper assembly, a rear energy management or bumper assembly and side impact assemblies on a vehicle. Impact beams at the front and rear of the vehicle are usually referred to as bumper beams, and impact beams on the sides of the vehicle are sometimes referred to as anti-intrusion bars. In all cases, it is desirable to provide an impact beam with low mass, high flexural stiffness and strength, and high energy absorption per unit mass. The lightweight requirement is predicated by fuel economy standards and the fact that impact beams are located both very close to and very far from the vehicle's center of mass. Maximizing the flexural stiffness and strength is necessary if the beam is to survive low speed impacts without damage and transfer impact loads throughout the duration of a high speed impact event. Further, a high level of energy absorption translates into reduced load transfer to the occupants of the vehicle, thus increasing safety.

In one known vehicle front energy management system, an impact beam is comprised of a top and bottom facesheet in combination with an internal structural core for providing high energy impact resistance in a light weight and cost effective manner. Typically, the impact beam for such a system includes aluminum, steel, carbon fiber, etc. layers that are extruded, roll-formed, etc. A hard energy absorbing layer may be formed on the impact beam having the general shape of an outer fascia trim panel. A soft energy absorbing layer is then formed on the hard energy absorbing layer and the front fascia panel is then provided over the soft energy absorbing layer. The combination of the hard energy absorbing layer and the soft energy absorbing layer provides a transition between the impact beam and the front fascia panel so as to allow the system to conform to the desired shape of the front fascia panel which may have significant angles and forms required by the vehicle styling. The hard energy absorbing layer and the soft energy absorbing layer also provide a transition between the fascia panel and the impact beam to effectively absorb low speed impacts without significantly compromising system integrity.

It is known in the art to provide vehicle impact beams having sandwich structures. These prior art impact beams can generally be categorized into three designs, namely, hollow beams that are fully or partially reinforced with a polymer or metallic foam, single or dual-sided facesheets reinforced with a honeycomb-like cellular core, and formed composite impact beams. For hollow metallic or polymer matrix composite tube structures which are fully or partially reinforced with a lightweight foam core, the material used for the core can be either a metallic or polymeric foam that is bonded, mechanically attached or interference fit into the tube structure. The purpose of the core is to carry shear loads in the sandwich structure and absorb energy in the event of a low or high speed impact, which is a distinction dependent on the density and composition of the foam. The use of honeycomb or honeycomb-like ordered cellular cores to provide reinforcement to one or two flat facesheets have an open-sided sandwich designs and have honeycomb, discrete-stiffened or wine-crate structures extending from the front face of the impact beam back towards the passenger compartment of the vehicle. If a second facesheet is not included between the core and the passenger compartment, then the core material must be relatively dense since it provides most of the flexural stiffness to the structure adjacent to the shear load transfer.

For continuous or discontinuous fiber reinforced polymer matrix composite impact beams, the matrix material may either be a thermoplastic or thermoset polymer introduced via resin transfer molding, compression molding, blow molding, or other similar fabrication processes.

It is also known in the art to fabricate a three-dimensional network of photopolymer waveguides comprising a unitary truss or lattice architecture, hereafter referred to equivalently as micro-truss or micro-lattice. For example, U.S. Pat. Nos. 7,653,279 and 7,382,959 disclose a process for fabricating such a micro-truss structure. Generally, the process includes providing a reservoir or mold filled with a volume of a curable monomer and covered by a mask including strategically positioned apertures. UV light sources are positioned relative to the mask and exposure to collimated UV light through the mask apertures forms a series of interconnected self-propagating photopolymer waveguides, referred to herein as struts, to form the truss or lattice architecture. Once the photopolymer waveguides are formed, the reservoir is emptied of the unpolymerized monomer which was not exposed to UV light. The micro-truss structure may then undergo a post-cure operation to increase the cross-link density in the photopolymer waveguides. This post-cure may be accomplished via a thermal cure, an additional exposure to UV light, an equivalent method or combination thereof.

SUMMARY OF THE INVENTION

The present disclosure describes a hierarchical sandwich box impact beam for a vehicle that includes spaced apart micro-truss sandwich structures defining an open area therebetween. The impact beam includes an outer facing sandwich structure including an outer facesheet, an inner facesheet and a micro-truss core formed therebetween, and an inner facing sandwich structure including an outer facesheet, an inner facesheet and a micro-truss core formed therebetween. One or more structural connecting sections are coupled to the inner and outer facing sandwich structures so as to define the open area between the structures.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a hierarchical sandwich or box impact beam is merely exemplary in nature, and is in no way intended to limit the invention or its applications or uses. For example, the present invention has particular application for a vehicle impact beam. However, as will be appreciated by those skilled in the art, the disclosed impact beam and other structural members, such as panels that have a similar construction, may have other applications.

Figure 1:
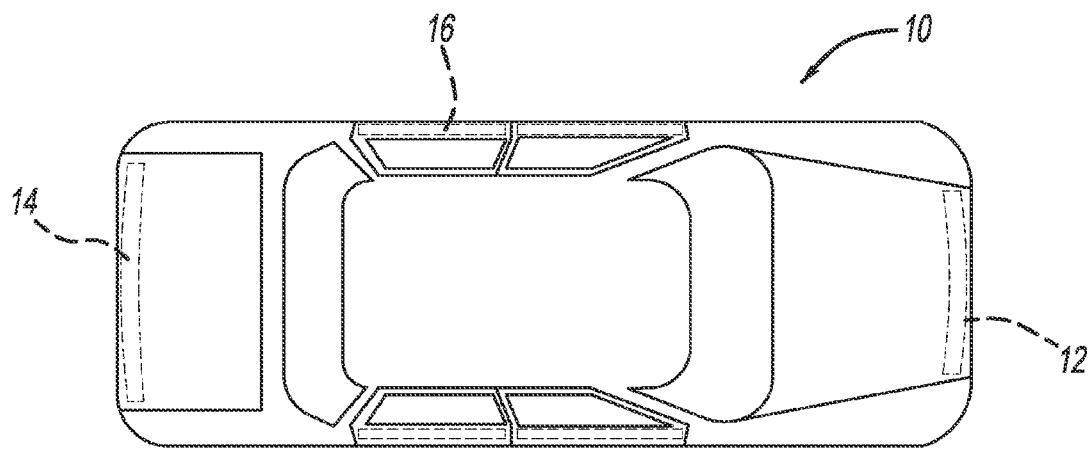
FIG. 1 is a top view of a vehicle showing locations where impact beams may be provided.

FIG. 1 is a top view of a vehicle 10 including a front bumper impact beam 12, a rear bumper impact beam 14 and side impact anti-intrusion beams 16. The illustration of the vehicle 10 shown in FIG. 1 is intended to give context to the invention discussed below to show locations on the vehicle 10 where high impact resistant, but light weight structural beams are usually provided on a vehicle. For the embodiment discussed herein, the beams 12, 14 or 16 include a sandwich box beam design having two separated micro-truss structures.

The micro-truss structures in the sandwich box impact beams discussed herein include an ordered three-dimensional network of self-propagating polymer waveguides grown from a photo-monomer resin using a controlled exposure to collimated UV light sources at specified orientations through a plurality of apertures in a mask. Any UV-curable photo-monomer or blend thereof that displays the self-propagation phenomenon can be used to form the micro-truss or micro-lattice architecture. Generally, the micro-truss formation process consists of placing a photo-monomer solution in a mold in contact with one facesheet, masking off a two-dimensional area on the opposite surface of the facesheet and mold, exposing the liquid monomer to collimated UV light sources at specific orientations through the patterned mask, and then removing the mask, mold and excess monomer to produce a networked three-dimensional polymer structure bonded to the surface of the facesheet.

Figure 2:
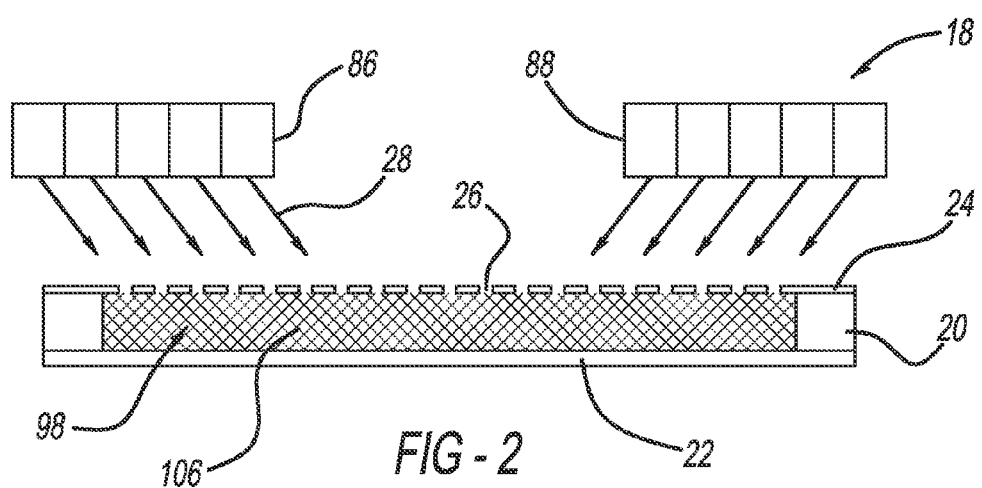
FIG. 2 is an illustration showing a micro-truss fabrication process.

FIG. 2 is an illustration 18 of such a process and shows a mold 20 in which the micro-truss structure is formed, where the mold 20 defines an enclosure in which the liquid photo-monomer resin is contained. A thin flat bottom facesheet 22 is provided in association the mold 20 and is the layer to which the micro-truss structure will adhere. The bottom facesheet 22 can be any material suitable for the beam being fabricated, such as aluminum, steel, thermoplastic polymers, carbon fiber composites, glass fiber composites, etc. A mask 24 including apertures 26 is positioned over the mold 20. Collimated ultraviolet (UV) light beams 28 from light sources 86 and 88, such as mercury arc lamps, is directed onto the mask 24 so that the collimated beams 28 of light travel through the apertures 26 and irradiate the monomer resin in the mold 20 to form a micro-truss structure 98 composed of a plurality of interconnected partially cured self-propagating photopolymer waveguides 106 in the known manner. The exposure time and intensity of the light sources 86 and 88 are controlled so that the micro-truss structure 98 is only partially cured so that it is malleable and bendable in a green state while still in the mold 20. After the structure 98 is removed from the mold it is then fully cured to its hardened state.

Figure 3:
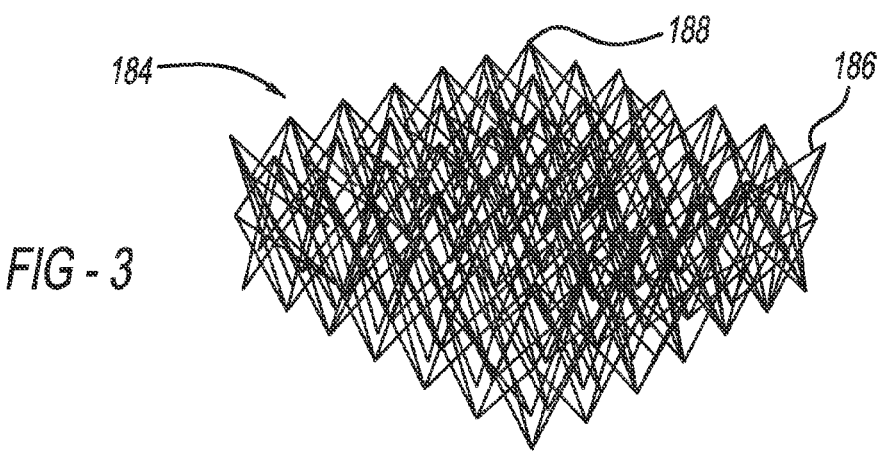
FIG. 3 is an isometric view of a micro-truss or micro-lattice suitable for the various micro-truss structures described herein.

FIG. 3 is an isometric view of a micro-truss lattice structure 184 including polymerized struts 186 of the type discussed herein formed by known micro-truss fabrication techniques separated from the facesheets. Nodes 188 are depicted at a top surface of the structure 184.

As will be discussed in detail below, the present invention proposes a number of structures and techniques for forming an automotive impact beam having a micro-truss hybrid sandwich box beam design. In one design, the impact beam is comprised of one or more sandwich facings joined together with a series of stiffening elements to form a box structure in which opposing faces of the beam have a sandwich construction. Incorporating a sandwich construction into the facings of the box beam enables a higher overall beam flexural stiffness and strength with reduced mass versus comparable extruded or stamped metallic impact beam. This translates into enhanced fuel economy and greater control over the vehicle mass distribution versus current impact beam designs. Furthermore, the design improves upon previous full depth sandwich impact beam designs where the sandwich core occupies the entire space between two opposing facesheets. Because the modular design of the proposed sandwich box beam allows for individual components to be fabricated separately and disassembled in the event of damage to the impact beam, this approach allows the structure to be repaired without replacement of the entire beam.

For the sandwich facesheets themselves, the use of a micro-truss core is highly advantageous as compared to other state-of-the-art core materials, such as metallic honeycomb or polymer foams. From a manufacturing standpoint, the present invention offers a significant reduction in labor time and part cost versus an equivalent box beam structure made from metallic honeycomb. The micro-truss core used in the box beam is formed as a net-shape and bonded onto one or more of the sandwich facesheets in a single operation. Unused material from this process can then be recycled and used in subsequent operations. Contrast this with the time-intensive and low-yield method for forming a honeycomb sandwich structure in which the expanded honeycomb is first machined into shape resulting in scrap material, and subsequently bonded to both surfaces of the sandwich beam in multiple operations.

The micro-truss core discussed herein also has enhanced strength and stiffness as compared to stochastic foam core materials that are capable of being formed net-shaped. Furthermore, unlike most core materials, the micro-truss architecture described herein allows for the properties of the sandwich beam to be spatially tailored to meet anticipated loading conditions. The ability to functionally grade the performance of the micro-truss core through the facesheets of the box beam ensures the highest level of structural efficiency, i.e., material is only placed where it is required.

The present invention is different from the known prior art methods in that the overall impact beam is no longer a sandwich structure, but only the facings have the sandwich construction. For automotive impact beams, the present design results in significant mass savings because the total volume of the core material is greatly reduced. While the core material used in the prior art does have a low density, the dimensions of a typical impact beam requires a sizable volume of the material to be used if the structure has a full-depth core design, which negates the lightweight properties of the core. Additionally, the integrated nature of the prior art designs requires that any damage to the impact beam results in replacement of the entire beam since the ability of the core to carry load is greatly diminished after damage or densification. Conversely, the present invention maintains the same lightweight, high stiffness, energy absorbing functionality of a sandwich construction, but its modularity allows for individual components to be replaced without removal of the entire beam. For automotive impact beams that are often damaged during collisions, this novel reparability can reduce the vehicle cost of ownership and provide an overall competitive advantage given that such factors are increasingly being included in safety ratings and insurance premiums.

In one embodiment, a second set of impact beam designs can be employed where the sandwich structure of the beam is replaced with localized stiffening members near the periphery of the beam. These stiffeners can be composed of supported or unsupported foam for honeycomb-like ordered cellular structures. Typically, these designs have a core structure that extends from the outer face of the impact beam back towards the passenger compartment of the vehicle.

The sandwich box impact beam of the present invention increases structural performance and reduces manufacturing process cost and time. Instead of forming the foam or honeycomb core separately, machining into shape, and then bonding to the impact beam, the present method allows for formation of the reinforcing core directly onto one or both sides of the sandwich facings in a net-shape. Therefore, the number of manufacturing operations required is significantly reduced, resulting in a far more cost-effective process. Furthermore, the use of a micro-truss architecture has inherent strength and stiffness benefits over randomly ordered stochastic foams because of a more efficient spatial arrangement in the micro-truss. Because the micro-truss architecture can also be graded over the length of the impact beam in a single manufacturing step, the stiffness, strength and energy absorption of the beam can all be tailored to a specific application instead of sizing the entire impact beam based on a worse case point design, resulting in an over-design structure that is significantly heavier.

The sandwich box impact beam of the present invention provides a lightweight, structurally efficient, mass-manufactural sandwich impact beam that enables heretofore unattainable design aspects to be achieved, such as single-step manufacturing of a net-shape sandwich facing, functional grading of the impact beam properties to meet specific requirements and integration of the core material with a diverse array of structural materials without the need for supplemental corrosion protection coatings.

In one embodiment of the invention, the outer sandwich facing and the inner sandwich facing are identical and have the same geometry, design and material composition. In other embodiments, the inner and outer facings may not be identical, either by changing the geometry, design or material composition of one of the facings with respect to the other. Such an asymmetric sandwich design is useful when the direction and nature of loading on the beam is known a priori and the composition of the beam can thus be tailored to the specific load case. In one embodiment, the impact beam has a prismatic cross-section in which the facesheets and core for both the sandwich facings are constant along the length direction. Alternatively, the cross-section of one or both of the sandwich facings may vary along the length of the impact beam. This variation may be accomplished either by changing the thickness of the facesheets, the thickness of the core, or the density, architecture, or composition of the core, i.e., functional grading. Additionally, the architecture of the core may also be varied through the thickness direction of the beams. The beam can possess curvature along one axis so that the normal vectors to the sandwich facings are not parallel to one another along the length of the beam. Alternately, the beam is straight so that all of the beam facing normals are parallel along the length dimension of the beam.

Along with the two sandwich facings comprising the inner and outer surfaces of the impact beam, a series of stiffening elements or side supports are used to connect the two facings and complete the structure of the box beam. In one embodiment, these side supports are continuous, prismatic sections with a double-F profile in which the inner and outer facings fit into the two sets of protrusions extending from the top and bottom of the supports. In an alternate embodiment, the side supports can be non-prismatic, with localized features for a discontinuous profile to increase the stiffness or reduce the mass of the supports. Additionally, several potential alternative designs are possible for the side brackets.

In addition to the architected micro-truss material forming the core of the impact beam sandwich facings, other micro-truss materials may be incorporated at the outer facing surface of the beam to function as an energy absorption (EA) padding material. These EA micro-truss layers are supported only on one side by the surface of the outer facing with the remaining surface constrained or bonded to a non-structural fascia. Typically, these EA micro-truss materials are composed of different polymer chemistries compared to those used for the impact beam sandwich core so that the outer EA material is several orders of magnitude more compliant then the inner structural reinforcing core. The method for integrating two or more micro-truss materials in the beam manufacturing process will be discussed in further detail below.

In the design of the impact beam, mechanical attachment or support hardware features may be added to the beam to couple it to the surrounding vehicle structure, attached the side support features, or provide functionality in the event of a collision. Particularly, the micro-truss sandwich core in one or both of the facings may be formed directly around internally or externally threaded inserts that provide locations for mechanical attachments passing through one or both facesheet surfaces. Tow lug devices may also be added to the sandwich impact beam structure to provide a hard point for tow line attachment in the event that the vehicle is disabled. The tow lug devices may be fastened to the impact beam using a fastener integration process or be welded directly to the beam if the outer facing surfaces are metallic.

In one embodiment, the facesheet materials used for structural reinforcement in the inner and outer sandwich facings of the box beam design are chosen so that the entire sandwich structure is fabricated and joined together in a single manufacturing process step. This single step process requires that at least one of the facesheet materials in each sandwich structure be composed of a material that is transparent at the UV wavelength used for the micro-truss formation. A UV-transparent plastic, such as polyethylene terephthalate, polymethyl methacrylate (PMMA) or polycarbonate (PC) is used for one facesheet in both sandwich structures that form the beam. The remaining facesheet in each sandwich facing structure is comprised of a non-UV transparent structural material, such as a continuous or discontinuous carbon fiber composite, a continuous or discontinuous glass fiber composite, an aluminum alloy, a structural steel, or any combination thereof. In addition, both facesheets in either or both of the sandwich facings may be comprised of a non-UV transparent material, where a second adhesive bonding step is required to form each sandwich facing structure.

The micro-truss core in each of the sandwich impact beam facings is comprised of an ordered three-dimensional network of self-propagating polymer waveguides. In one embodiment, the side support members used to form the box structure and connect the inner and outer facings of the impact beam are formed from extruded aluminum alloy sections. Alternatively, other metallic or polymeric materials can be used to form the side support sections. Operations such as injection molding, extrusion, stamping, or casting, could all be used to form metal or plastic side support structures.

In one impact beam manufacturing process, the micro-truss core is grown directly onto both of the two sandwich facesheets by exposing through a first UV-transparent facesheet and in situ bonding to the second facesheet. In an alternate embodiment, if a UV-transparent facesheet is not used, the second facesheet is joined to the core using an adhesive material applied to the facesheet and/or the exposed surface of the micro-truss. This adhesive may be composed of a single or a multi-part paste or a continuous sheet of film. Additional materials, such as glass scrim or syntactic fillers, may be added to the adhesive to maintain control of the bond line thickness. Other bonding operations that do not require a film adhesive may also be used.

The discussion above of the various embodiments for a sandwich box impact beam and method of fabricating will now further be discussed with reference to the various figures.

Figure 4:
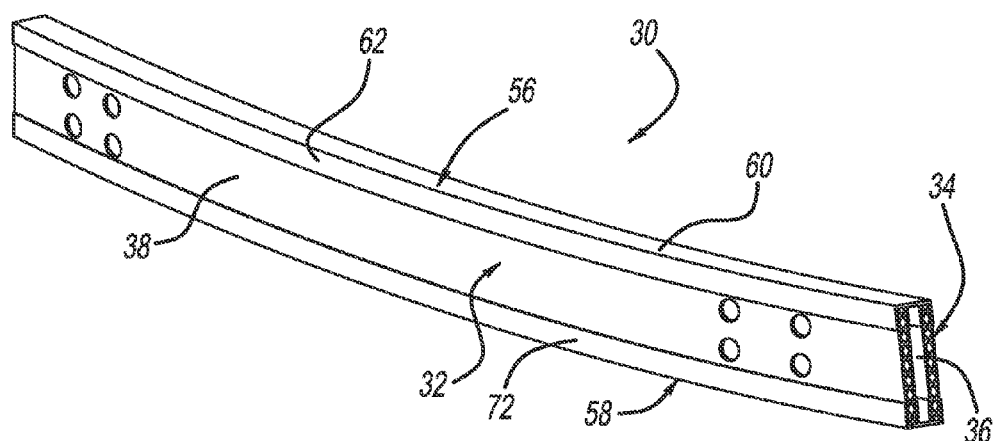
FIG. 4 is an isometric view of a curved sandwich box impact beam including spaced apart sandwich structures each including a micro-truss core.
Figure 5:
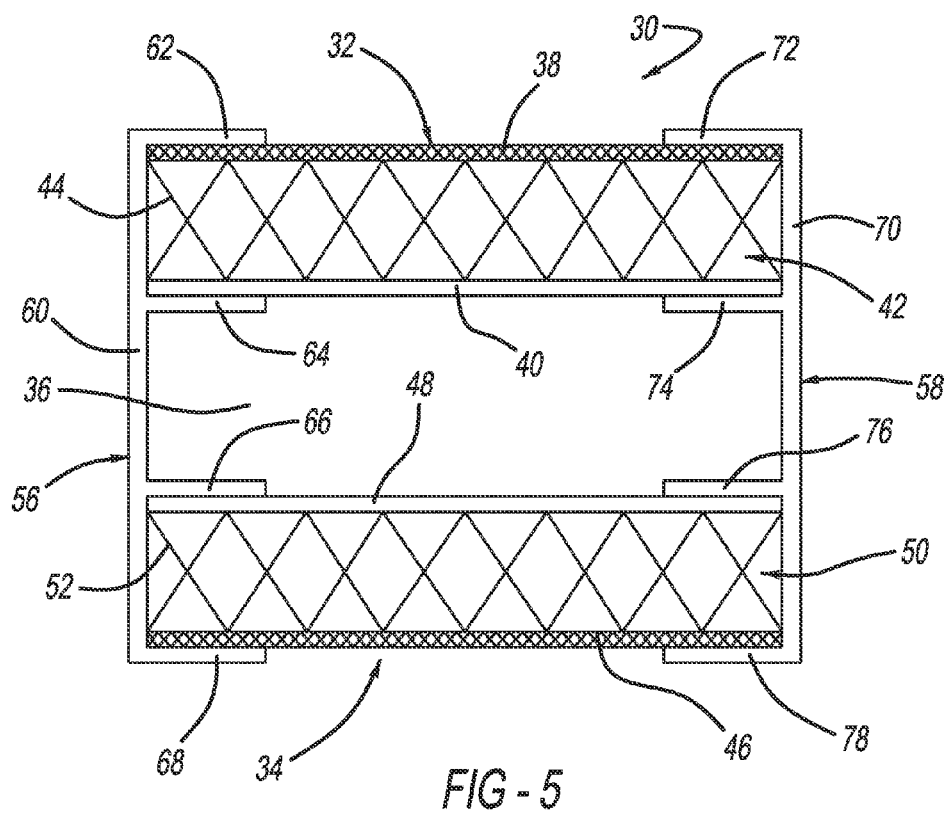
FIG. 5 is a cross-sectional view of the impact beam shown in FIG. 4.

FIG. 4 is an isometric view and FIG. 5 is a cross-sectional view of a curved sandwich box impact beam 30 including an outer facing sandwich structure 32 and an inner facing sandwich structure 34 defining an open area 36 therebetween of the type discussed above. The outer facing structure 32 includes a micro-truss structure having an outer facesheet 38 and an inner facesheet 40 separated by a micro-truss core 42 including polymerized struts 44. Likewise, the inner facing sandwich structure 34 includes an outer facesheet 46 and an inner facesheet 48 separated by a micro-truss core 50 including polymerized struts 52. The facesheets 38, 40, 46 and 48 can be made of any suitable thin facesheet material, such as steel, aluminum alloy, carbon fiber composite, glass fiber composite, etc. In this non-limiting embodiment, the facesheets 38 and 46 are shown being made of the same material and the facesheets 40 and 48 are shown being made of the same material, where the outer facesheets 38 and 46 are made of a different material than the inner facesheets 40 and 48.

The inner and outer facing sandwich structures 32 and 34 are secured together to define the open area 36 using two double-F channel support sections 56 and 58 coupled to edges of both of the inner and outer facing sandwich structures 32 and 34, as shown. The support section 56 includes a cross-element 60, a pair of spaced apart flanges 62 and 64 positioned against outer surfaces of the facesheets 38 and 40, respectively, and flanges 66 and 68 positioned against outer surfaces of the facesheets 46 and 48, respectively. Likewise, the support section 58 includes a cross-element 70, a pair of opposing flanges 72 and 74 positioned against outside surfaces of the facesheets 38 and 40, respectively, and a pair of opposing flanges 76 and 78 positioned against outer surfaces of the facesheets 46 and 48, respectively, at an opposite side of the inner facing sandwich structure 34.

The support sections 56 and 58 can be secured to the inner and outer facing sandwich structures 32 and 34 by any suitable technique. In one embodiment, mechanical attachments (not shown), such as bolts, rivets, fasteners, etc., are used to connect the sandwich structures 32 and 34 to the support sections 56 and 58 so as to enable disassembly of the impact beam 30 in the event of damage to one or more of the components. Alternately, the support sections 56 and 58 may be coupled to the sandwich structures 32 and 34 using available bonding or joining methods, such as fusion welding, ultrasonic welding, adhesive bonding, friction welding, spray adhesive bonding, interference fit, etc. Once the support sections 56 and 58 are attached to the sandwich structures 32 and 34, finishing operations can be performed to integrate the potential features of the impact beam 30. For example, subtractive machining operations may be performed to trim sections of the beam 30 or to provide holes for moisture drainage from the cores 42 and 50. Additionally, support brackets or mechanical attachments may be added to allow the sandwich structures 32 and 34 or the support sections 56 and 58 to interface with and transfer loads to surrounding vehicle components.

The dimensions of the various components of the impact beam 30 can be any suitable dimensions for the particular impact beam application and within the capabilities of the micro-truss fabrication process. In one non-limiting example, the dimensions of the impact beam 30, or other impact beams discussed herein, can include an overall length of 0.5-2.5 m, an overall width of 100-500 mm, a total thickness of 7-60 mm, a sandwich structure thickness of 3-22 mm, a facesheet thickness of 0.25-5 mm, a sandwich core thickness of 2-20 mm, a degree of beam curvature of 0-45°, a radius of curvature of 0.5-10 m and a thickness of the side support sections of 0.8-4.0 mm.

Figure 6:
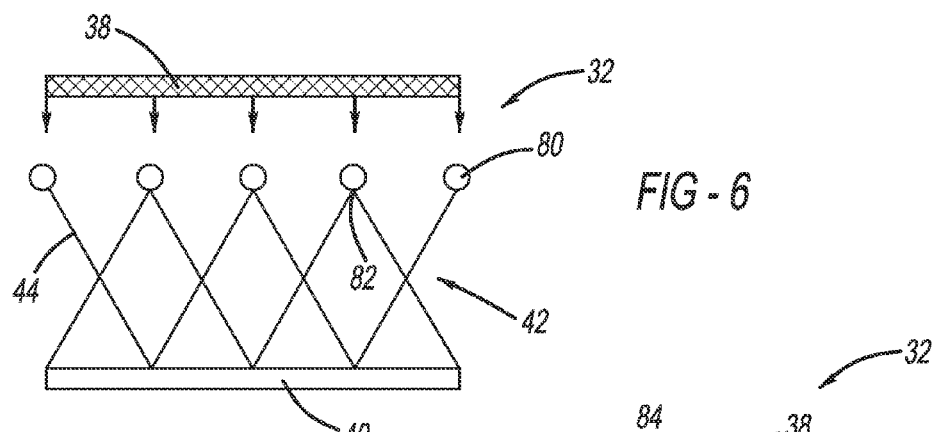
FIG. 6 is a cross-sectional type view showing a step for gluing a top facesheet to a micro-truss core.
Figure 7:
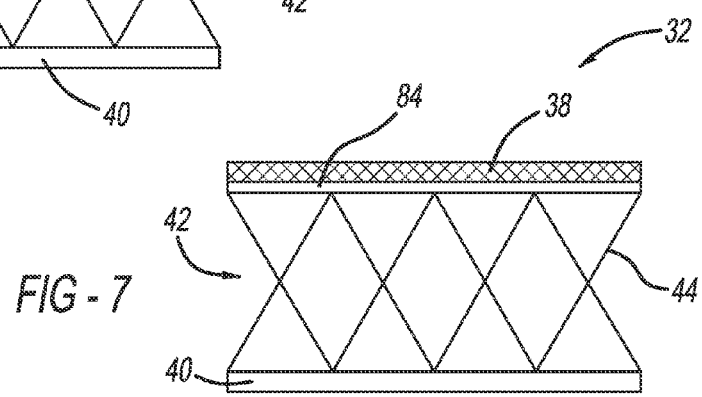
FIG. 7 is a cross-sectional type view of a micro-truss structure including a cured adhesive bond layer.

The inner and outer facing sandwich structures 32 and 34 are separately formed by the micro-truss fabrication processes discussed herein and well understood by those skilled in the art. For example, referring to the outer facing sandwich structure 32, the micro-truss core 42 may be fabricated or grown on the facesheet 40 by known micro-truss fabrication processes where UV light is used to cure liquid monomer waveguides. The outer facesheet 38 can be a non-UV transparent or UV transparent material, where if the facesheet 38 is non-UV transparent, it is adhered to top surfaces of the micro-truss core 42. This embodiment is illustrated in FIG. 6 showing the sandwich structure 32 with the top facesheet 38 separated from the micro-truss core 42, and showing adhesive 80 on nodes 82 of the micro-truss core 42 opposite to the facesheet 40. The adhesive 80 on the top surface of the micro-truss core 42 may be applied to the nodes 82 or the free edges of the struts 44. The micro-truss core 42 can be dipped or roll coated with the adhesive 80. Alternately, a cured adhesive bond layer 84 can be provided to secure the facesheet 38 to the micro-truss core 42 as shown in FIG. 7. If the top facesheet 38 is made from a UV-transparent material, then it is secured to the micro-truss structure when the struts 44 are polymerized during the fabrication process.

Figure 8:
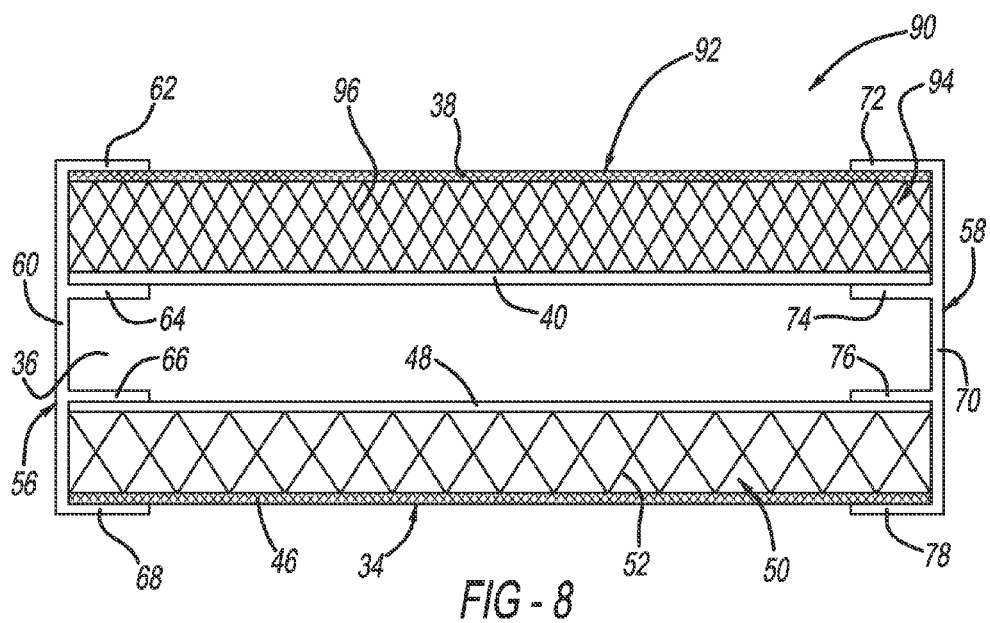
FIG. 8 is a cross-sectional view of a sandwich box impact beam including spaced apart sandwich structures having two different types of micro-truss cores.

As discussed above, the inner and outer facing sandwich structures 32 and 34 can have different micro-truss core designs to provide different shear loads and structural rigidity for any particular vehicle impact beam. For example, it may be desirable to provide the outer facing sandwich structure 32 to have a less rigid micro-truss core than the inner facing sandwich structure 34 such as can be found in the soft energy absorbing layer of a vehicle bumper assembly. This embodiment is illustrated in FIG. 8 showing a cross-sectional view of a sandwich box impact beam 90 similar to the impact beam 30, where like elements are identified by the same reference number. In this embodiment, the outer facing sandwich structure 32 is replaced with outer facing sandwich structure 92 including a micro-truss core 94 with struts 96 having a different design than the micro-truss core 50 to provide the softer structure. Further, it is noted that by using the appropriate mask and UV light sources, the micro-truss core 94 can be graded along its length so that the specifics of the micro-truss core 94 can change at different cross sectional locations in the beam 90.

Figure 9:
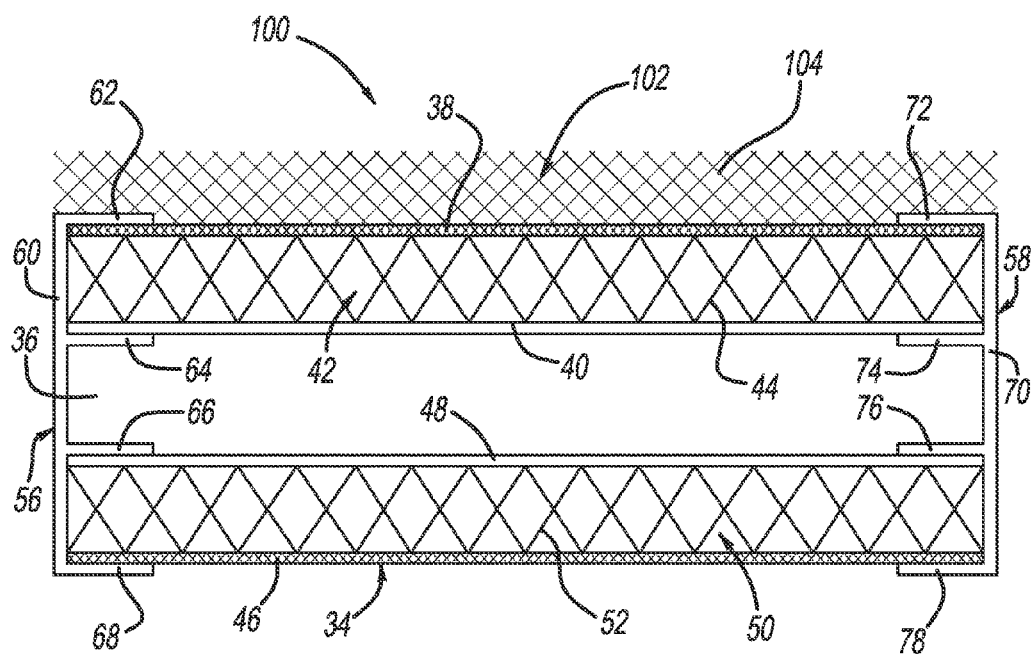
FIG. 9 is a cross-sectional view of a sandwich box impact beam including spaced apart sandwich structures and an outer facing micro-truss padding layer.

In another embodiment, the impact beam 30 can include an outer padding layer that sometimes may be desirable, for example, in a vehicle bumper beam assembly. FIG. 9 is a cross-sectional view of a sandwich box impact beam 100 similar to the beam 30, where like elements are identified by the same reference number. In this embodiment, an outer facing energy absorbing micro-truss padding layer 102 including struts 104 is fabricated on the top facesheet 38 after the micro-truss structure 42 has been formed. The padding layer 102 can be any suitable padding layer having less rigidity than other micro-truss structures and can also be fabricated by known micro-truss processes.

As discussed above, the open area 36 between the inner and outer facing sandwich structures 32 and 34 is defined by the double-F channel support sections 56 and 58. That open area between the sandwich structures 32 and 34 can be provided by other box designs some of which are discussed in FIGS. 10-13 below. It is noted that the various micro-truss structure fabrication processes and beam assembly techniques discussed herein can be employed for all of these embodiments as would be appropriate.

Figure 10:
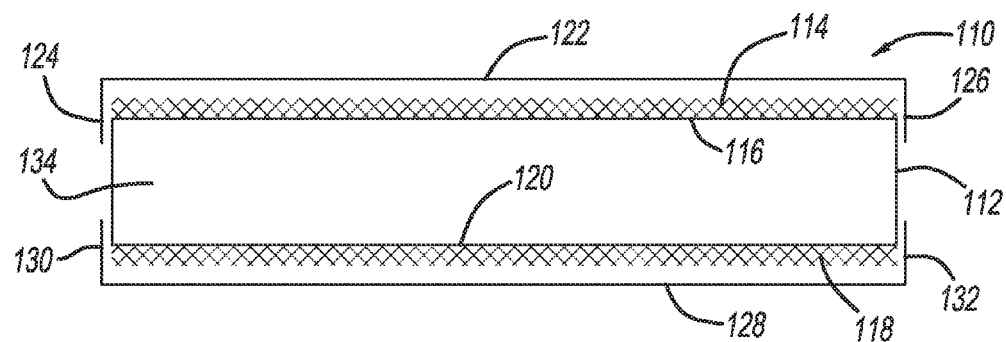
FIG. 10 is a cross-sectional type view of a sandwich box impact beam including an interior box section.

FIG. 10 is a cross-sectional type view of another sandwich box impact beam 110 including a closed inner box member 112 defining an open area 134 and being formed by any suitable process, such as roll forming, stamping, etc. An outer micro-truss structure 114 is fabricated on a panel 116 of the box member 112 and a micro-truss structure 118 is fabricated on an opposite panel 120 of the box member 112. A top facesheet 122 including side flanges 124 and 126 is then secured, such as by adhesive, to the micro-truss structure 114, and a bottom facesheet 128 including side flanges 130 and 132 is secured to the micro-truss structure 118, such as by an adhesive.

Figure 11:
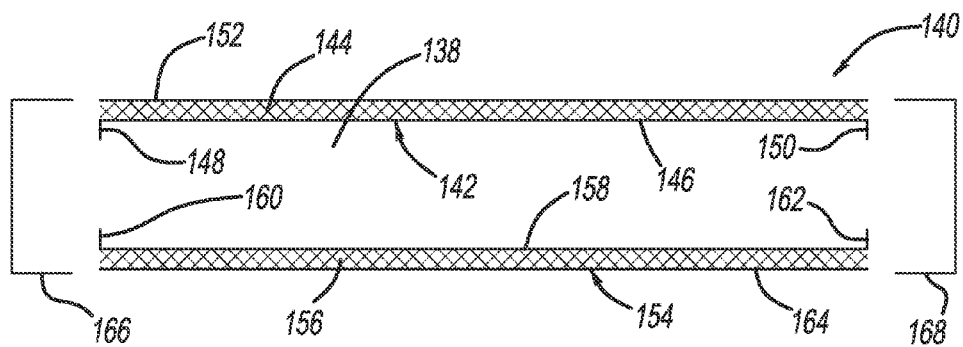
FIG. 11 is cross-sectional type view of a sandwich box impact beam including dual-flanged facesheets and C-channel end caps.

FIG. 11 is a cross-sectional type view of another sandwich box impact beam 140 including an outer facing sandwich structure 142 having a micro-truss core 144 fabricated on an inner facesheet 146 having end flanges 148 and 150. An outer facesheet 152 is secured to the micro-truss core 144 opposite the inner facesheet 146. Likewise, an inner facing sandwich structure 154 includes a micro-truss core 156 fabricated on an inner facesheet 158 including side flanges 160 and 162, and an outer facesheet 164 is secured to the micro-truss core 156 opposite to the facesheet 158. A C-shaped member 166 is formed over one edge of the sandwich structures 142 and 154 and a C-shaped member 168 is formed over an opposite edge of the sandwich structures 142 and 154 to define an open area 138.

Figure 12:
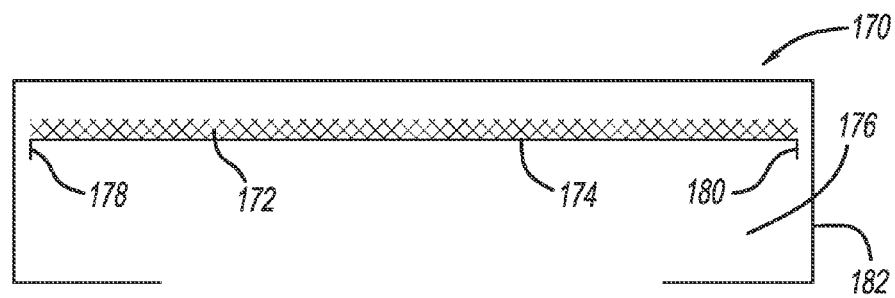
FIG. 12 is a cross-sectional type view of a sandwich box impact beam including an outer roll formed support structure.

FIG. 12 is a cross-sectional type view of another sandwich box impact beam 170 including a single micro-truss structure 172 formed on an inner facesheet 174 including end flanges 178 and 180. A closed or partially closed box beam 182 is formed around the micro-truss structure 172, where the beam 182 may be an existing vehicle structure, to define an open area 176.

Figure 13:
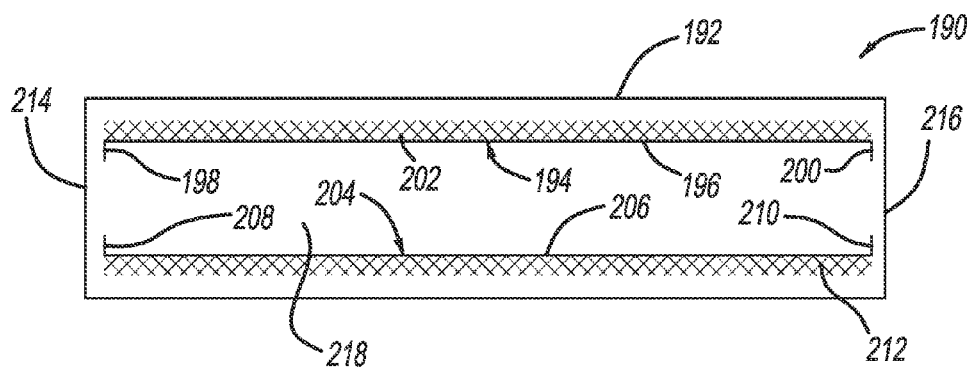
FIG. 13 is a cross-sectional type view of a sandwich box impact beam including an outer box section.

FIG. 13 is a cross-sectional type view of another sandwich box impact beam 190 including an outer box beam 192 in which is positioned an outer facing sandwich structure 194 including a facesheet 196 having end flanges 198 and 200 on which is fabricated a micro-truss core 202, and a inner facing sandwich structure 204 including a facesheet 206 having end flanges 208 and 210 on which is fabricated a micro-truss core 212. Side panels 214 and 216 of the box beam 192 are secured to the flanges 198, 200, 208 and 210 so as to define an open area 218 between the inner and outer facing sandwich structures 194 and 204.

Figure 14:
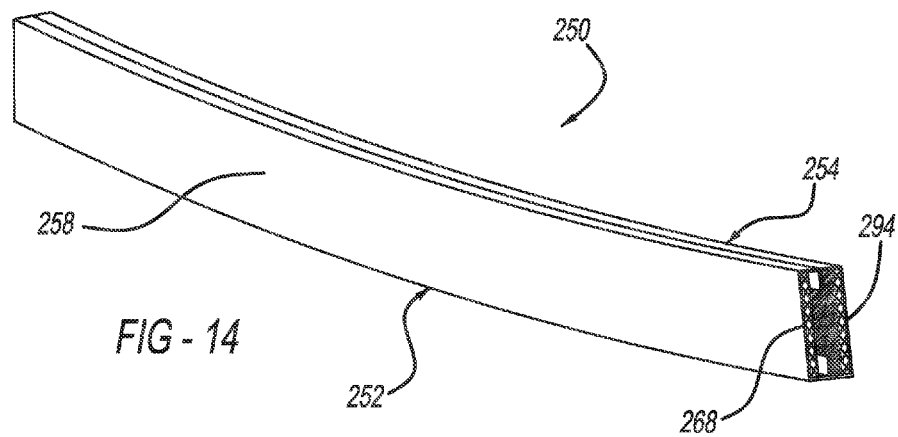
FIG. 14 is an isometric view of another curved sandwich box impact beam including spaced apart micro-truss structures.
Figure 15:
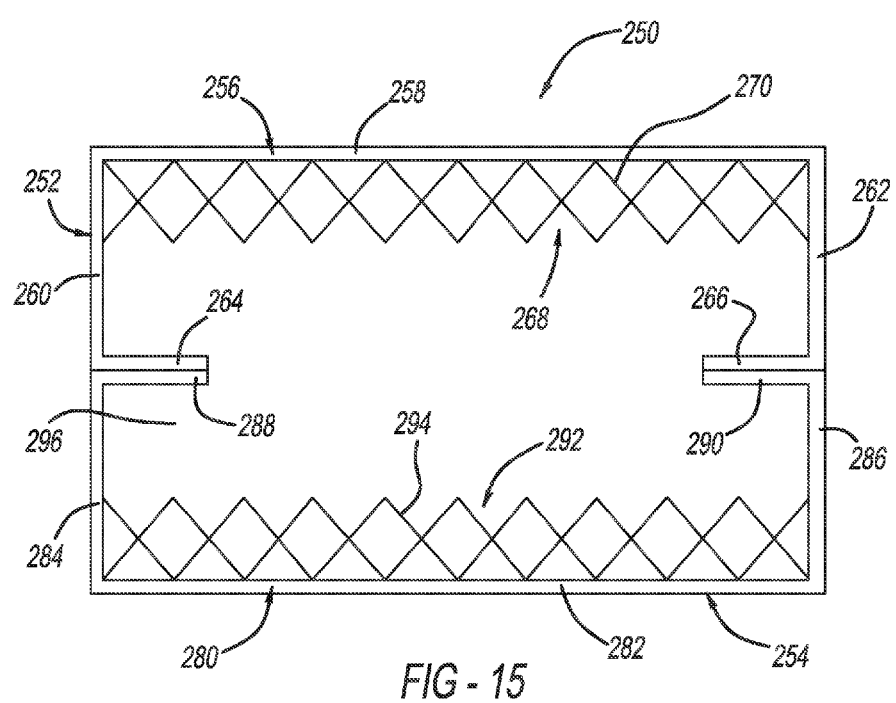
FIG. 15 is a cross-sectional view of the impact beam shown in FIG. 14.

FIG. 14 is an isometric view and FIG. 15 is a cross-sectional view of another curved sandwich box impact beam 250 including an outer facing micro-truss structure 252 and an inner facing micro-truss structure 254. The micro-truss structure 252 includes a single piece C-shaped support element 256 having a facesheet 258, opposing side panels 260 and 262, and inwardly extending flanges 264 and 266 extending from the side panels 260 and 262, respectively. The outer facing micro-truss structure 256 also includes a micro-truss core 268 having polymerized struts 270 formed on an inner surface of the facesheet 258 within the C-shaped element 256. Likewise, the micro-truss structure 254 includes a single piece C-shaped support element 280 including a facesheet 282, opposing side panels 284 and 286, and inwardly extending flanges 288 and 290 extending from the side panels 284 and 286, respectively. The inner facing micro-truss structure 254 also includes a micro-truss core 292 including polymerized struts 294 formed on an inner surface of the facesheet 282 within the C-shaped element 280. The box structure is formed in this manner to define an open area 296 between the micro-truss cores 268 and 292. The materials, thicknesses, configurations, etc. of the elements of the micro-truss structures 252 and 254 can be any of those discussed above that would be suitable for this embodiment.

In this embodiment, the C-shaped elements 252 and 254 are configured by roll forming a suitable metal, such as steel, to form the general C-shape of the elements 252 and 254 without the flanges 264, 266, 288, 290. This elongated C-shape structure is then used as a trough or enclosure in which the liquid photo-monomer resin is contained. As discussed above, a suitable mask having apertures and UV light sources are provided for the micro-truss fabrication process to form the micro-truss cores 268 and 292 on the inner surface of the facesheets 258 and 282, respectively. Once the micro-truss cores 268 and 292 have been fully cured, then a metal shaping process is performed on the side panels 260, 262, 284, 286 to fold over and form the flanges 264, 266, 288 and 290. The structures 252 and 254 are formed separately in this manner. Once the structures 252 and 254 are formed as described, then the structures 252 and 254 are positioned against each other in a suitable fixture (not shown) so that the flanges 264 and 288 contact each other and the flanges 266 and 290 contact each other, as shown. The structures 252 and 254 are then secured together by welding along the seam where the flanges 264, 266, 288 and 290 are coupled together. Other securing techniques can be employed, such as gluing.

Figure 16:
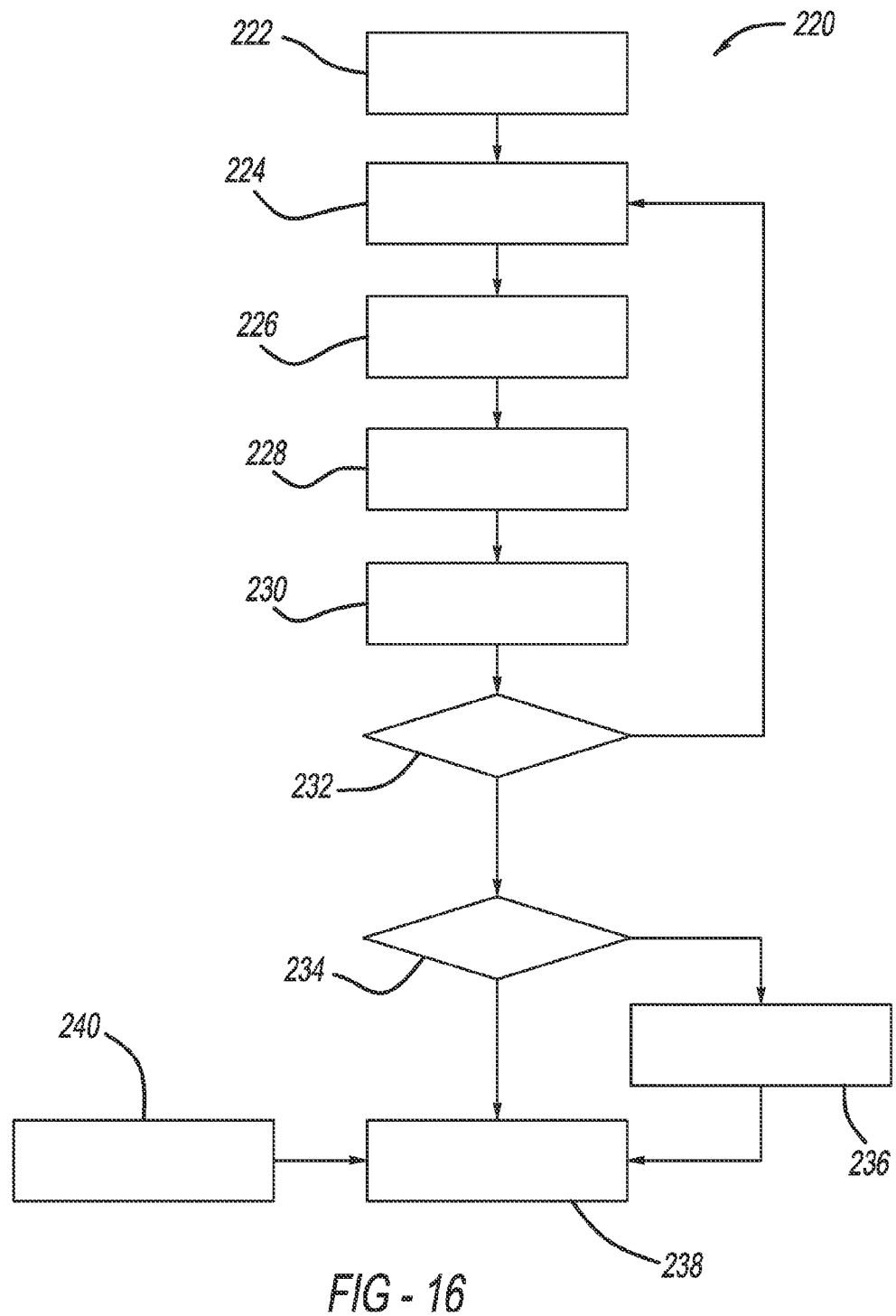
FIG. 16 is a flow chart diagram showing a process for fabricating a sandwich box impact beam.

FIG. 16 is a flow chart diagram 220 showing a general process for fabricating the various sandwich box impact beams discussed above. At box 222, the facesheets for the inner and outer facing sandwich structures 32 and 34 are fabricated. At box 224, the micro-truss mold, mask and fixtures are assembled and configured as appropriate for the particular impact beam. The particular micro-truss structure is then fabricated on the particular facesheet at box 226 by exposing the liquid monomer to collimated UV light through the mask to partially cure the micro-truss structure. The mold is then disassembled at box 228 and the unused monomer is recycled. Also, the now partially cured micro-truss structure on the particular facesheet is removed from the fixtures. The micro-truss structure on the facesheet is then fully cured at box 230, possibly in a curved format. The process then determines whether another sandwich structure is to be fabricated at decision diamond 232, such as may be required for the sandwich box impact beams discussed herein. If so, the process returns to the box 224 to assemble the mold and mask for that structure. If no other sandwich structures are to be fabricated at the decision diamond 232, the process determines whether the top facesheet was a UV transparent facesheet at decision diamond 234, meaning that both of the facesheets are already secured to the micro-truss structure, and if not, the process secures the outer facesheet to the micro-truss cores discussed above at box 236. If the outer facesheet was UV transparent at the decision diamond 234 or if the top facesheet was secured to the micro-truss core 236, the next step is to assemble the box beam at box 238 using the particular support sections as discussed above, where those support sections are provided at box 240.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A structural assembly comprising:
    an outer facing sandwich structure including an outer facesheet, an inner facesheet and a core formed therebetween;
    an inner facing sandwich structure including an outer facesheet, an inner facesheet and a core formed therebetween; and
    at least one structural connecting section coupled to the inner and outer facing sandwich structures so that the inner facesheets face each other and define an open area therebetween, wherein the cores are micro-truss cores.

2. The structural assembly according to claim 1 wherein the cores of the outer facing sandwich structure and the inner facing sandwich structure are the same.

3. The structural assembly according to claim 1 wherein the cores of the outer facing sandwich structure and the inner facing sandwich structure are different.

4. The structural assembly according to claim 1 wherein the outer facing sandwich structure is a soft energy absorbing layer and the inner facing sandwich structure is a hard energy absorbing layer.

5. The structural assembly according to claim 1 wherein the outer facing sandwich structure and the inner facing sandwich structure are curved structures.

6. The structural assembly according to claim 1 further comprising an energy absorbing micro-truss padding layer formed on the outer facesheet of the outer facing sandwich structure.

7. The structural assembly according to claim 1 wherein the outer facesheets for both of the inner and outer facing sandwich structures are UV transparent facesheets.

8. The structural assembly according to claim 1 wherein the outer facesheets for both of the inner and outer facing sandwich structures are non-UV transparent facesheets.

9. The structural assembly according to claim 8 wherein the outer facesheets are glued to the micro-truss cores.

10. The structural assembly according to claim 1 wherein the inner and outer facesheets for both of the inner and outer facing sandwich structures are selected from the group consisting of thermoplastic sheets, thermoset plastic sheets, aluminum alloy sheets, steel sheets, glass fiber composite sheets and carbon fiber composite sheets.

11. The structural assembly according to claim 1 wherein the at least one structural connecting section is a pair of double-F channel sections each including a first channel that holds an edge of the outer facing sandwich structure and a second channel that holds an edge of the inner facing sandwich structure.

12. The structural assembly according to claim 1 wherein the at least one structural connecting section includes an inner box beam, said inner box beam including both of the inner facesheets.

13. The structural assembly according to claim 1 wherein the at least one structural connecting section includes an outer box beam, said outer box beam including both of the outer facesheets.

14. The structural assembly according to claim 1 wherein the at least one structural connecting section includes two opposing C-channel members that hold an edge of the outer facing sandwich structure and an edge of the inner facing sandwich structure.

15. The structural assembly according to claim 1 wherein the at least one structural connecting section includes a partially enclosed box section coupled to the outer facing sandwich structure with an opening of the partially closed box section opposite the outer facing sandwich structure.

16. The structural assembly according to claim 1 wherein the structural assembly is a vehicle impact beam.

17. An impact beam for a vehicle, said impact beam comprising:
    an outer facing sandwich structure including an outer facesheet, an inner facesheet and a micro-truss core formed therebetween;
    an inner facing sandwich structure including an outer facesheet, an inner facesheet and a micro-truss core formed therebetween; and a pair of double-F channel sections coupled to the inner and outer facing sandwich structures and defining an open area therebetween, each double-F channel section including a first channel that holds an edge of the outer facing sandwich structure and a second channel that holds an edge of the inner facing sandwich structure.

18. The impact beam according to claim 17 wherein the micro-truss cores of the outer facing sandwich structure and the inner facing sandwich structure are the same.

19. The impact beam according to claim 17 wherein the micro-truss cores of the outer facing sandwich structure and the inner facing sandwich structure are different.

20. The impact beam according to claim 17 wherein the outer facing sandwich structure is a soft energy absorbing layer and the inner facing sandwich structure is a hard energy absorbing layer.

21. The impact beam according to claim 17 wherein the outer facing sandwich structure and the inner facing sandwich structure are curved structures.

22. The impact beam according to claim 17 further comprising an energy absorbing micro-truss padding layer formed on the outer facesheet of the outer facing sandwich structure.

23. The impact beam according to claim 17 wherein the outer facesheets for both of the inner and outer facing sandwich structures are UV transparent facesheets.

24. The impact beam according to claim 17 wherein the top facesheet for both of the inner and outer facing sandwich structures are non-UV transparent facesheets.

25. A structural assembly comprising:
an outer facing structure including an outer C-shaped support element having an outer facesheet and opposing side panels defining an outer open area, each side panel of the outer C-shaped element including a flange extending therefrom being substantially parallel to the outer facesheet, said outer facing structure including an outer micro-truss core formed on an inside surface of the outer facesheet within the outer open area; and
an inner facing structure including an inner C-shaped support element having an inner facesheet and opposing side panels defining an inner open area, each side panel of the inner C-shaped element including a flange extending therefrom being substantially parallel to the inner facesheet, said inner facing structure including a inner micro-truss core formed on an inside surface of the inner facesheet within the inner open area, wherein the flanges of the outer C-shaped element are secured to the flanges of the inner C-shaped element so that the outer and inner open areas oppose each other.

26. The structural assembly according to claim 25 wherein the outer and inner C-shape elements are formed by a metal rolling process.

27. The structural assembly according to claim 25 wherein the outer and inner micro-truss cores are the same.

28. The structural assembly according to claim 25 wherein the outer and inner micro-truss cores are different.

29. The structural assembly according to claim 25 wherein the outer facing structure is a soft energy absorbing structure and the inner facing structure is a hard energy absorbing structure.

30. The structural assembly according to claim 25 wherein the outer facing structure and the inner facing structure are curved structures.

31. The structural assembly according to claim 25 wherein the flanges of the outer C-shaped element are secured to the flanges of the inner C-shaped element by welding.

32. The structural assembly according to claim 25 wherein the structural assembly is a vehicle impact beam.

33. A structural assembly comprising:
an outer facing sandwich structure including an outer facesheet, an inner facesheet and a core formed therebetween;
an inner facing sandwich structure including an outer facesheet, an inner facesheet and a core formed therebetween; and
at least one structural connecting section coupled to the inner and outer facing sandwich structures so that the inner facesheets face each other and define an open area therebetween, wherein the cores of the outer facing sandwich structure and the inner facing sandwich structure are different.

34. A structural assembly comprising:
an outer facing sandwich structure including an outer facesheet, an inner facesheet and a core formed therebetween;
an inner facing sandwich structure including an outer facesheet, an inner facesheet and a core formed therebetween; and
at least one structural connecting section coupled to the inner and outer facing sandwich structures so that the inner facesheets face each other and define an open area therebetween, wherein the outer facing sandwich structure is a soft energy absorbing layer and the inner facing sandwich structure is a hard energy absorbing layer.

35. A structural assembly comprising:
an outer facing sandwich structure including an outer facesheet, an inner facesheet and a core formed therebetween;
an inner facing sandwich structure including an outer facesheet, an inner facesheet and a core formed therebetween; and
at least one structural connecting section coupled to the inner and outer facing sandwich structures so that the inner facesheets face each other and define an open area therebetween, wherein the outer facing sandwich structure and the inner facing sandwich structure are curved structures.

36. A structural assembly comprising:
an outer facing sandwich structure including an outer facesheet, an inner facesheet and a core formed therebetween;
an inner facing sandwich structure including an outer facesheet, an inner facesheet and a core formed therebetween;
at least one structural connecting section coupled to the inner and outer facing sandwich structures so that the inner facesheets face each other and define an open area therebetween; and
an energy absorbing micro-truss padding layer formed on the outer facesheet of the outer facing sandwich structure.

37. A structural assembly comprising:
an outer facing sandwich structure including an outer facesheet, an inner facesheet and a core formed therebetween;
an inner facing sandwich structure including an outer facesheet, an inner facesheet and a core formed therebetween; and
at least one structural connecting section coupled to the inner and outer facing sandwich structures so that the inner facesheets face each other and define an open area therebetween, wherein the at least one structural connecting section includes a partially enclosed box section coupled to the outer facing sandwich structure with an opening of the partially closed box section opposite the outer facing sandwich structure.

38. A structural assembly comprising:
an outer facing sandwich structure including an outer facesheet, an inner facesheet and a core formed therebetween;
an inner facing sandwich structure including an outer facesheet, an inner facesheet and a core formed therebetween; and
at least one structural connecting section coupled to the inner and outer facing sandwich structures so that the inner facesheets face each other and define an open area therebetween, wherein the structural assembly is a vehicle impact beam.

* * * * *